Patented Sept. 29, 1931

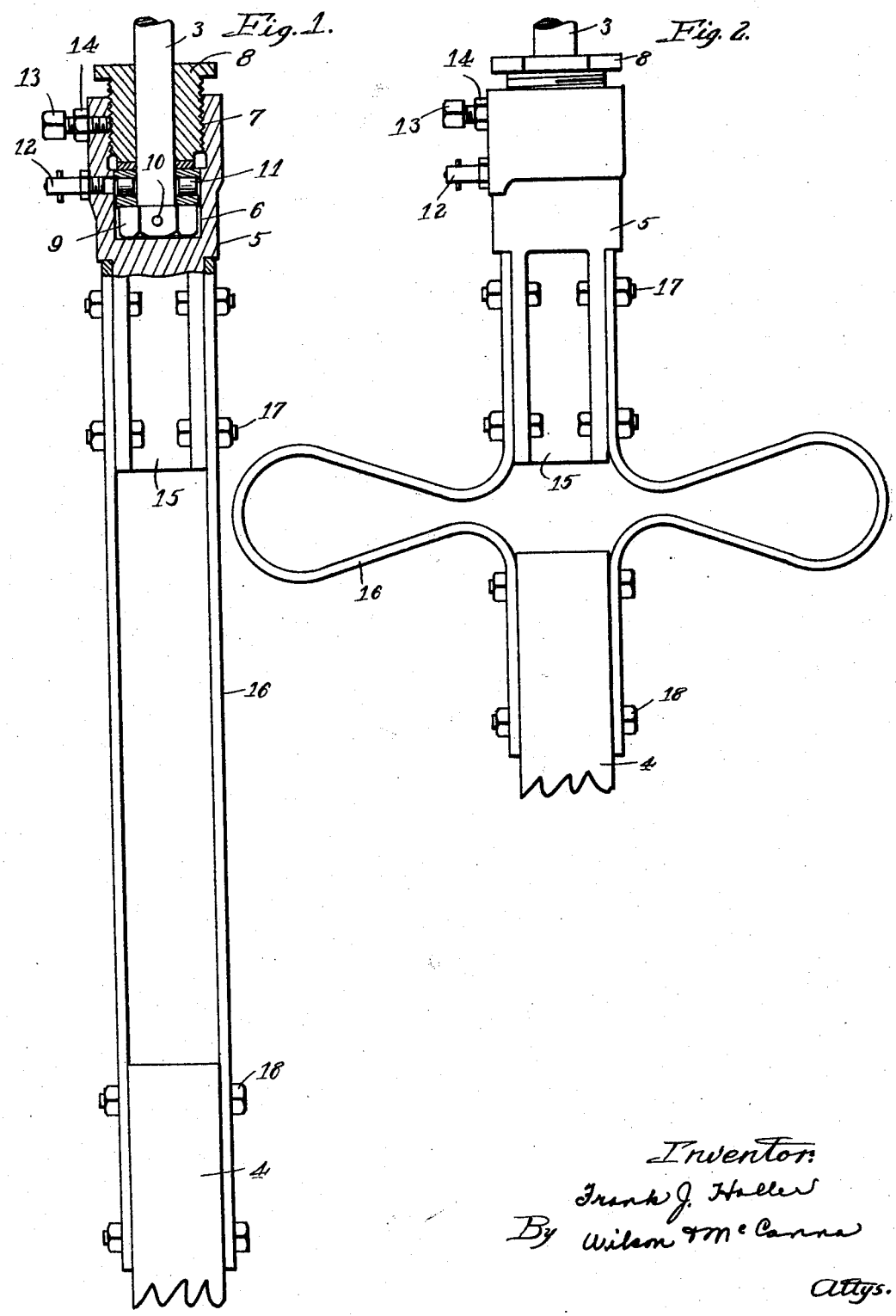

1,825,449

UNITED STATES PATENT OFFICE

FRANK J. HALLER, OF FREEPORT, ILLINOIS, ASSIGNOR TO STOVER MANUFACTURING & ENGINE CO., OF FREEPORT, ILLINOIS, A CORPORATION OF ILLINOIS

WINDMILL SUCKER ROD CONNECTION

Application filed January 9, 1929. Serial No. 331,372.

This invention relates to windmills and has particular reference to a novel form of connection between the plunger rod and the pump or sucker rod.

A troublesome feature of windmills has been the danger of breakage of pitmen or other parts of the gearing owing to the well freezing or the cylinder filling with sand. Heretofore, so far as I am aware, no safety provision has been made to avoid damage to the mill in either of these contingencies. It is, therefore, the object of my invention to provide what might be called a yield section in the connection between the plunger rod and sucker rod arranged to give in the event of excessive resistance to movement of the sucker rod by the plunger rod, so as to allow the mill to operate idly until the trouble is remedied and thus avoid possible costly damage.

The invention is illustrated in the accompanying drawings, wherein—

Figure 1 is a view partly in section and partly in elevation of my improved adjustable swivel-safety connection provided between a plunger rod and a sucker rod; and Fig. 2 is a view showing how the straps constituting the yield section of the connection are arranged to buckle in the event of an overload.

The same reference numerals are applied to corresponding parts in the two views.

The numeral 3 designates the plunger rod extending from the mill head on the tower down to the pump for connection with the sucker rod 4. The plunger rod 3 is, of course, arranged to be reciprocated in the turning of the wind wheel and is, furthermore, arranged to turn with the shifting of the mill according to changes of the wind. This operation of the plunger rod necessitates a swivel connection with the sucker rod, which will first be described. A socket member 5, which for the present will be assumed as mounted rigidly on the upper end of the sucker rod, has a socket 6 in the upper end thereof internally threaded, as shown at 7, to receive an externally threaded plug 8. The latter fits over the lower end of the plunger rod, which is suitably threaded to take a nut 9 arranged to fit in the socket 6 in front of the plug 8. A pin 10 serves to hold the nut 9 against unthreading. Now it will be seen that the rod 3 can turn in the plug 8 relative to the rod 4. I prefer that an anti-friction roller bearing 11 be provided between the plug 8 and the nut 9 to assume the end thrust transmitted from the rod 3 to the rod 4 and make it easy for the former to turn with respect to the latter. A pressure lubricator nipple 12 threading in a hold in the wall of the socket 6 adjacent the bearing 11 enables the swivel connection to be kept well lubricated so as to work as easily as possible at all times and minimize wear. Now, with this form of swivel connection it will be seen that as soon as any wear occurs and the connection commences to work noisily, it is a simple matter to give the plug 8 a quarter turn or so to take up the play and keep the mill working smoothly and quietly. A set screw 13 threaded in the wall of the socket 6 is arranged to be tightened to keep the plug in its adjusted position. A lock nut 14 is in turn provided on the set screw 13 and is arranged to be tightened against the outside of the socket member 5 to keep the set screw from loosening. The construction thus far described is not claimed in this application.

The socket member 5 has, preferably cast integral therewith, a channel-shaped shank portion 15 to the outside of the flanges of which two straps 16 are arranged to be bolted, as at 17. The straps 16 have the other ends fastened to the upper end of the sucker rod 4 as by means of bolts 18. Now, these straps under ordinary operating conditions are stiff enough as well as strong enough to transmit the reciprocation of the plunger rod 3 to the sucker rod 4, but in the event the sucker rod meets with any unusual and excessive resistance to movement, as would be occasioned if the well were to freeze or the pump cylinder to become filled with sand, these straps are arranged to buckle substantially as shown in Fig. 2 and allow the plunger rod 3 to reciprocate idly without operating the sucker rod. The straps 16 must necessarily be of such length that the space left between the end of the sucker rod 4 and the end of the shank 15 of the socket member 5 is appreciably greater than the stroke of the plunger rod 3. In Fig. 2 this fact is indicated, it being assumed that the sucker rod 4 is shown stalled at the upper end of its stroke and that the plunger rod 3 is at the lower end of its stroke. Sufficient clearance is allowed for the buckling of the straps 16 which, if they are not damaged seriously by the buckling, are arranged to be removed and hammered straight to be used over again. An extra pair of these straps should, however, be kept on hand ready for use in case they are needed. With this feature of a yield section provided in the connection between the plunger rod and the sucker rod there is absolutely no danger of the breakage of pitmen or other parts of the gearing of the mill in the event a contingency arises which interferes with the normal operation of the mill, as described above.

The invention is covered in the appended claims with and without limitation to the specific features of construction and arrangement hereinabove described, it being the intention to cover all legitimate modifications and adaptations.

I claim:

1. In a windmill, the combination of a plunger rod, a sucker rod arranged to be reciprocated thereby, and one or more parts providing a normally rigid connection between said rods, said parts being arranged to buckle in the event of inability of the sucker rod to move and said parts being of sufficient length to space the end of the one rod with respect to the adjoining end of the other a distance at least equivalent to the stroke of the plunger rod.

2. In a windmill, the combination of a plunger rod, a sucker rod, a part mounted on the end of one of said rods having a shank portion extending toward the other rod and of approximately the same width as said other rod, and a pair of straps fastened to the opposite sides of said shank at one end and at the other end to the opposite sides of the other rod, said straps serving to space the end of the shank from the end of the rod a distance corresponding at least to the length of the stroke of the plunger rod.

3. In a windmill, the combination of a plunger, a sucker rod, and one or more thin metallic strips joining the ends of said rods and keeping them spaced a distance corresponding at least to the length of the stroke of the plunger rod, said strips being normally stiff enough to transmit the reciprocation of the plunger rod to the sucker rod, but being arranged to buckle in the event of excessive resistance to reciprocation of the sucker rod.

4. The structure set forth in claim 3, wherein the strips are malleable and arranged to be removed and hammered straight after they have been buckled, so that they may be used again.

5. In combination, a plunger rod, a sucker rod arranged to be reciprocated thereby, and one or more parts providing a normally rigid connection between said rods holding the ends thereof in spaced relation, said parts being arranged to buckle in the event of excessive resistance to movement of the sucker rod whereby to allow movement of the plunger rod independently of the sucker rod.

6. The combination set forth in claim 5 wherein the parts comprise malleable metallic strips arranged to be straightened out after they are buckled to permit their use again.

In witness of the foregoing I affix my signature.

FRANK J. HALLER.